(12) United States Patent
Törmänen et al.

(10) Patent No.: US 12,339,847 B2
(45) Date of Patent: Jun. 24, 2025

(54) COMPUTER-IMPLEMENTED METHOD FOR PERFORMING A SYSTEM ASSESSMENT

(71) Applicant: Volvo Car Corporation, Gothenburg (SE)

(72) Inventors: Mikael Törmänen, Gothenburg (SE); Anders Hägglund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 92 days.

(21) Appl. No.: 17/732,700

(22) Filed: Apr. 29, 2022

(65) Prior Publication Data

US 2023/0350895 A1    Nov. 2, 2023

(51) Int. Cl.
*G06F 16/2455*    (2019.01)

(52) U.S. Cl.
CPC ................. *G06F 16/2455* (2019.01)

(58) Field of Classification Search
CPC ...... G06F 9/541; G06F 9/4411; G06F 9/4494; G06F 9/4488; G06F 21/577
USPC .......................................................... 707/758
See application file for complete search history.

(56) References Cited

U.S. PATENT DOCUMENTS

| | | | | |
|---|---|---|---|---|
| 6,999,907 B2* | 2/2006 | Smith | ...................... | G06F 30/13 703/22 |
| 7,073,050 B2* | 7/2006 | Chen | ................... | H04L 41/0883 713/1 |
| 7,146,350 B2* | 12/2006 | Holland | .................. | G06Q 10/04 717/102 |
| 8,245,281 B2* | 8/2012 | Cheeniyil | ............. | H04L 63/102 709/227 |
| 8,355,926 B1* | 1/2013 | Hinz | ....................... | G06Q 10/10 705/2 |
| 8,676,746 B2* | 3/2014 | Tsai | ..................... | G06F 11/0727 707/758 |
| 9,009,837 B2* | 4/2015 | Nunez Di Croce | .. | G06F 16/951 713/168 |
| 10,026,049 B2* | 7/2018 | Asenjo | ..................... | G06Q 10/06 |
| 10,574,702 B1* | 2/2020 | Rickerd | ................... | H04L 63/20 |
| 10,673,784 B1* | 6/2020 | Perez Rodreguez | ........................ | H04L 67/535 |
| 10,706,155 B1* | 7/2020 | Veselov | .............. | G06F 9/45558 |
| 10,956,869 B2* | 3/2021 | Lahti | ..................... | G06Q 10/105 |
| 11,238,016 B1* | 2/2022 | Srinivasan | ............ | G06F 16/212 |
| 11,238,049 B1* | 2/2022 | James | ...................... | G06F 40/30 |

(Continued)

*Primary Examiner* — Hanh B Thai
(74) *Attorney, Agent, or Firm* — Clements Bernard Walker; Christopher L. Bernard; Devin Cummins

(57) ABSTRACT

A computer-implemented method for performing a system assessment, including: collecting a plurality of meta configuration information sets of prior system assessments in a database, wherein the meta configuration information sets including a plurality of specification data objects and application plugin information, associating the plurality of specification data objects and the application plugin information with at least one context attribute based on their purpose during performing the system assessment, labelling at least one of the specification data objects and the application plugin information using at least one label in regard to at least one context attribute, filtering the plurality of meta configuration information sets to find a meta configuration information set required for the system assessment based on at least one label, and executing the system assessment based on the meta configuration information set found by filtering.

17 Claims, 2 Drawing Sheets

(56) References Cited

U.S. PATENT DOCUMENTS

| | | | |
|---|---|---|---|
| 11,271,961 B1* | 3/2022 | Berger | G06F 9/451 |
| 11,615,322 B1* | 3/2023 | Thomas | G06N 5/00 |
| | | | 717/145 |
| 11,625,585 B1* | 4/2023 | Thomas | G06N 3/02 |
| | | | 706/15 |
| 11,741,131 B1* | 8/2023 | Dwivedi | G06F 16/2474 |
| | | | 707/758 |
| 2002/0169734 A1* | 11/2002 | Giel | G06Q 10/04 |
| | | | 706/45 |
| 2003/0163807 A1* | 8/2003 | Drake | G06F 8/61 |
| | | | 717/174 |
| 2005/0060372 A1* | 3/2005 | DeBettencourt | G06Q 20/202 |
| | | | 709/206 |
| 2005/0186549 A1* | 8/2005 | Huang | G09B 7/02 |
| | | | 434/322 |
| 2006/0026157 A1* | 2/2006 | Gupta | G06F 16/84 |
| 2006/0064486 A1* | 3/2006 | Baron | H04L 41/0886 |
| | | | 709/224 |
| 2006/0248165 A1* | 11/2006 | Sridhar | H04L 43/062 |
| | | | 709/218 |
| 2008/0077474 A1* | 3/2008 | Dumas | G06Q 30/0201 |
| | | | 705/7.29 |
| 2008/0168135 A1* | 7/2008 | Redlich | G06F 16/282 |
| | | | 709/204 |
| 2009/0126022 A1* | 5/2009 | Sakaki | G06F 21/12 |
| | | | 726/25 |
| 2009/0254572 A1* | 10/2009 | Redlich | G06Q 10/10 |
| 2010/0198662 A1* | 8/2010 | Kalmus | G06Q 10/00 |
| | | | 726/28 |
| 2010/0250497 A1* | 9/2010 | Redlich | G06Q 10/06 |
| | | | 707/661 |
| 2012/0059680 A1* | 3/2012 | Guthrie | G06Q 10/063 |
| | | | 705/7.11 |
| 2012/0208162 A1* | 8/2012 | Huang | G09B 7/02 |
| | | | 434/262 |
| 2013/0174263 A1* | 7/2013 | Nunez Di Croce | |
| | | | H04L 63/1433 |
| | | | 726/25 |
| 2014/0255893 A1* | 9/2014 | Huang | G09B 7/02 |
| | | | 434/262 |
| 2014/0258316 A1* | 9/2014 | O'Hagan | G06F 16/215 |
| | | | 707/756 |
| 2014/0337086 A1* | 11/2014 | Asenjo | G06F 3/0635 |
| | | | 705/7.28 |
| 2014/0358944 A1* | 12/2014 | Brower, Jr. | G06Q 10/0639 |
| | | | 707/736 |
| 2015/0033305 A1* | 1/2015 | Shear | G06F 21/53 |
| | | | 726/11 |
| 2015/0067160 A1* | 3/2015 | Sridhar | H04L 43/062 |
| | | | 709/224 |
| 2015/0121155 A1* | 4/2015 | Boshev | H04L 41/0893 |
| | | | 714/48 |
| 2015/0149491 A1* | 5/2015 | Redlich | G06F 16/93 |
| | | | 707/755 |
| 2015/0199410 A1* | 7/2015 | Redlich | G06F 16/2455 |
| | | | 707/754 |
| 2015/0200967 A1* | 7/2015 | Redlich | G06F 16/282 |
| | | | 726/1 |
| 2015/0277976 A1* | 10/2015 | De | G06F 9/4843 |
| | | | 718/101 |
| 2015/0348090 A1* | 12/2015 | Alsina | G06Q 30/0244 |
| | | | 705/14.43 |
| 2016/0005056 A1* | 1/2016 | Gunjan | G06Q 30/0202 |
| | | | 705/7.31 |
| 2016/0085970 A1* | 3/2016 | Rebelo | G06F 21/51 |
| | | | 726/25 |
| 2016/0358230 A1* | 12/2016 | Wilson | G06Q 30/0277 |
| 2017/0192873 A1* | 7/2017 | Ozdemir | G06F 8/658 |
| 2017/0220403 A1* | 8/2017 | Maag | G06F 11/3692 |
| 2017/0286456 A1* | 10/2017 | Wenzel | G16H 10/20 |
| 2018/0042543 A1* | 2/2018 | Jenkins | G16H 20/30 |
| 2018/0115473 A1* | 4/2018 | Sridhar | H04L 67/06 |
| 2018/0268341 A1* | 9/2018 | Rini | G06Q 10/06398 |
| 2018/0374054 A1* | 12/2018 | Chamala | G09B 7/02 |
| 2019/0236478 A1* | 8/2019 | Wu | G06N 20/00 |
| 2019/0340306 A1* | 11/2019 | Harrison | G06T 15/506 |
| 2019/0392001 A1* | 12/2019 | Carothers | G06N 3/049 |
| 2020/0091765 A1* | 3/2020 | Bahramirad | G01R 21/133 |
| 2020/0174991 A1* | 6/2020 | Rendahl | G06Q 30/0245 |
| 2021/0064812 A1* | 3/2021 | Walkingshaw | G06F 40/103 |
| 2021/0105518 A1* | 4/2021 | Kannan | H04N 21/251 |
| 2022/0075793 A1* | 3/2022 | Jezewski | G06N 5/04 |
| 2023/0041181 A1* | 2/2023 | Wang | G06Q 30/015 |

* cited by examiner

COMPUTER-IMPLEMENTED METHOD FOR PERFORMING A SYSTEM ASSESSMENT

TECHNICAL FIELD

The present disclosure relates to a computer-implemented method for performing a system assessment, a computer program element for performing a system assessment, a computer storage media and a computer system including such computer storage media.

BACKGROUND

In engineering, computational analysis is carried out for a purpose of predicting performance or property of a technical system, which typically depends on many aspects such as an exact configuration of each subsystem of the technical system, different measurements to record during or after a simulation, precision required by the solver, initial and environmental conditions, and a precise load-case the system. This may be reflected in a set-up or a configuration of the simulation.

Practically, the computational analysis requires setting up a numerical model of the technical system, populating it with suitable parameters, subjecting them to intended initial and boundary conditions, choosing a suitable solver system, deciding a hardware and evaluating results. This means, each step of the simulation requires input or configuration data and decisions. Traditionally, this information, i.e. configuration data has been collected from wherever it originates, and inserted into a context of the simulation, and the simulation is carried out. In case a subsequent analysis is requested, the corresponding entities need to be altered, and the simulation is to be repeated.

There are simulation systems, which allow for a more modular approach of the subsystems, where a part of the configuration can be altered without changing entire data set. These systems are tailored for a specific simulation domain, and generally split the configuration in parts that more or less match different physical domains. When working in larger projects in larger organizations, it is important to keep data under control and make it accessible for all the participants responsible for evaluating the various attributes.

SUMMARY

Hence, there may be a need to provide an improved method for preparing and executing a system assessment, which may optimize a utilization of a wide variety of data.

The problem is at least partially solved or alleviated by the subject matter of the present disclosure. It should be noted that the aspects of the disclosure described in the following apply to the computer-implemented method for performing a system assessment, the computer program element for performing a system assessment, the computer storage media and the computer system including such computer storage media.

According to the present disclosure, a computer-implemented method for performing a system assessment is presented. The computer-implemented method includes collecting a plurality of meta configuration information sets of prior system assessments in a database, wherein the meta configuration information sets including a plurality of specification data objects and application plugin information, associating the plurality of the specification data objects and the application plugin information with at least one context attribute based on their purpose during performing the system assessment, labelling at least one of the specification data objects and the application plugin information using at least one label in regard to at least one context attribute, filtering the plurality of meta configuration information sets to find a meta configuration information set required for the system assessment based on at least one label, and executing the system assessment based on the meta configuration information set found by filtering.

The computer-implemented method according to the present disclosure may provide a simplified but reliable data backbone. Particularly, by combining standardized application protocol via the application plugin information, a modular information structure of the specification data objects and metadata referenced based on their purpose in the system assessment, a strong data backbone may be provided. Further, the method may enable a standardized process for a collaborative interchange of data generated during preparing, executing and/or after the system assessment. In other words, such meta data sets may be also capable to define a relationship between a technical system and decisions via the database containing a change history of each part.

To understand or predict a technical object or a technical system, computational analysis may be performed. For instance, the system assessment may be applied for predicting and/or analyzing a crash event of a vehicle, a driving performance of the vehicle, etc. Such assessment or simulation may be based on information describing the system to be analyzed and its environment. For instance, the information may include geometrical parameters non-geometrical parameters and/or systematic commands.

Each meta configuration information set may be adapted to provide information for performing the system assessment regarding an assessment application tool to be utilized, the assessment environment to be set up, system and parametric specifications to be applied in the system assessment, requirements for analyzing and reporting etc. The meta configuration information set may include such information by means of a mask, which may be standardized and act as a global template for the system assessment. Accordingly, a user may be able to easily launch a system assessment independently of an object or a system to be simulated, an assessment tool to be utilized, a test environment and/or test parameters.

The meta configuration information set may be generated automatically or manually. The meta configuration information set may form a foundation for building and executing the system assessment. The meta configuration information set may reference or indicate a particular work order providing entire technical information necessary to perform the system assessment. The technical information may define specifications such as a particular aspect of analysis including environment, system configuration, sensor technology, test sequence, use cases, post-processing, reporting, experiment set-up, etc. contained in the plurality of specification data objects.

The application plugin information may be a part of a process scheduler. The process scheduler may apply a multi-disciplinary design optimization process. The application plugin information may be configured to interface between the specification data objects and the data set generated by the assessment application tool. The application plugin information may be configured to utilize simple open formats.

Various meta configuration information sets applied in the previous system assessments may be stored or collected in the database. The database may be located in a storage medium, which may be connected to a computing device performing the system assessment directly or over a network. The database may include a single database or several databases connected to share stored data.

The method according to the present disclosure may define data handling processes, which may be open and applied by the same entity as the one producing the data. Storing data may be set up separately from data-generating processes, enabling any data generator to pull/push results, i.e. generated data in a same location.

One or more context attributes for the specification data objects and each of the application plugin information may be identified according to at least one of multitude of aspects related to their purpose for the system assessment. In other words, the context attributes may indicate a role of the specification data objects and each of the application plugin information during performing the system assessment. One specification data object and/or one application plugin information may be associated or linked to one or more context attributes.

Such associated specification data object and application plugin information may be labelled by at least one label defining or describing the respective context attribute(s). Each label may indicate each context attribute. In other words, the label may describe meaning of specification data object or the application plugin information. Each label may be attributed to a specific specification data object or a specific application plugin information regardless of their version. The label may be added to the specification data object or the application plugin information at any time, and the same label may be used for several specification data objects or application plugin information.

With the label(s), it may be possible to cluster the specification data object and/or the application plugin information sharing any label or aspect, for instance classifying the specification data objects or the application plugin information associated with same areas of investigation, same tools, similar technical solutions or attributes, program information or the like. Further, using the label, it may be possible to find a similar test-setup as a starting point for a new system assessment.

The meta configuration information set for the intended system assessment may be found by filtering the plurality of meta configuration information sets by means of the labels referencing the same or similar purpose of the intended system assessment. By filtering the specification data objects and/or the application plugin information stored in the database using a certain label, all information required for performing the system assessment may be found regardless of simulation domain or other aspect. The data sets may be identified by a file name, but not exact version when using labels.

The browsing and filtering the plurality of meta configuration information sets may be made using a purpose-build user interface, where the user can make database queries and view the results. Subsequently, the system assessment may be executed based on the meta configuration information set collected or found by filtering.

In an example, the method further includes reviewing the filtered meta configuration information set collected by filtering and modifying at least one of the specification data objects or the application plugin information of the filtered meta configuration information set to create a new meta configuration information set. After the specification data objects or the application plugin information are filtered, the reviewing step may be followed if all of the filtered information may be required for performing the intended system assessment and/or contain the necessary information.

If not, at least one individual specification data object and/or at least one application plugin information may be adjusted for fulling the requirements of the intended system assessment. Hence, the new meta configuration information set may include one or more specification data objects and/or the application plugin information modified according to the requirements of the intended system assessment.

The step of review and/or modifying the filtered meta configuration information set may be performed by a user or automatically according to pre-defined requirements of system assessment.

In an example, the method further may include executing the system assessment based on the new meta configuration information set.

In an example, the method further includes storing the new meta configuration information set in the database, and labelling the specification data objects and the application plugin information of the new meta configuration information set using at least one label in regard to at least one context attribute. After the validation of the new meta configuration information set, for instance by building the assessment environment and executing the system assessment using an automated configuration and execution engine, the user may publish the meta configuration information set to the database.

Each of the specification data objects and/or the new application plugin information of the new meta configuration information set may be also associated with at least one context attribute based on their purpose during performing the system assessment and classified by at least one label in regard to at least one context attribute. Additionally, the whole set of the specification data objects and/or the application plugin information of the new meta configuration information set may be labelled with at least one new label describing a new purpose of the system assessment.

In an example, the application plugin information includes a process scheduler information including at least one application protocol interface and/or at least one analysis methodology. The process scheduler information may include, for instance, modules for the execution steps such as configuring, building, running, analyzing the system assessment, modules containing tool-specific sub-classes of the individual steps, extending the functionality for each tool integration, a session handler sub-package for treating a state of an ongoing simulation, examples for implemented environments, utility functionality, handling format translations, mathematical conversions, package files for requirements, building and testing code, documentations etc.

Generally, to build an assessment environment and/or execute the system assessment, an assessment application tool, in other words simulation tool such as MATLAB, ANSYS, Simpy, etc. may be applied. Each assessment application tool, however, may require its own data format. Such application-depending format is generally difficult to share between different assessment application tools. Hence, the data files may often have to be adapted individually for the assessment application tool, which may lead to generating duplicate information demanding a large data storage capacity.

The application protocol interface may be configured to interface between the specification data objects to be collected to perform the system assessment and the data set of the assessment application tool. The application protocol interface may be instantiated from the generic code portion which may be extended by the application-specific code portion.

The generic code portion may be a tool agnostic part and configured for a generic specification interpretation. The generic code portion may be defined by a modular code framework containing general code taking care of all settings that are generic regarding the user, the platform and the system. The generic code portion may be configured to provide a standardized instruction to the application-specific code portion and the application-specific code portion may be configured to modify a format of the plurality of specification data objects linked to the specification hierarchy for the assessment application tool to be utilized.

Whereas the application-specific code portion may be adapted for each assessment application tool requirements, to take care of the tool-specific settings. Particularly, the application-specific code portion may be configured to modify the format of the specification data objects with respect to the assessment application tool to be utilized. In other words, the application-specific code portion may include codes for modifying the format of the specification data objects with respect to the assessment application tool to be utilized.

Hence, the specification data objects may be interpreted by the generic code portion and their format may be converted to a format compatible with the assessment application tool to be utilized. Accordingly, the application plugin information may allow a unified interface between the specification data objects and various assessment application tools. As a result, the specification data objects may not need to include the format for each individual application tool and universally applied in any assessment application tool.

Further, the application plugin information may be configured for defining at least one analysis methodology from the specification data objects standardized by the application protocol interface, particularly by the generic portion. Hence, the analyses may be recreated in a traceable and quality-ensured way. The standardized process may contain all relevant data for the analyses, grouping the information in logical chunks, enabling versioning of the meta configuration information sets, etc.

In an example, the method further includes filtering the meta configuration information set being performed by a database query based on at least one label. The plurality of meta configuration information sets stored in the database may be filtered by executing the database query. Since the specification data objects and the application plugin information of the plurality of meta configuration information sets may be labelled with one or more labels, the database query may be facilitated by requesting the label(s) complying with the purpose of the intended system assessment. The label(s) applied in the database query may be entered in the process scheduler and/or the application plugin information.

In an example, the method further includes tagging a specific meta configuration information set including specification data objects and the application plugin information with at least one tag. The specific meta configuration information set is unchangeable. The tag may include a precise attribute or content including a version of the assigned set of the specification data objects or the application plugin information. Accordingly, the tag may not be shared and/or re-used in several sets of the specification data objects or the application plugin information. In other words, the tag may be unique for the specific meta configuration information set. Using the unique tag, it may be possible to find a similar test-setup as a starting point for a new system assessment. In addition, a unique tag may be a prerequisite for enabling an automation process to retrieve a unique set of files.

In an example, the label includes at least one attribute of assessment setup, architecture, project, product ID, product attributes, application tools and post-process. In other words, the label may reflect the purpose of the associated specification data objects or the application plugin information in the system assessment. By applying such labels, the meta configuration information sets may be sorted in an intuitive way, which may improve filtering the meta configuration information set required for the system assessment.

In an example, the tag may include a unique milestone mark, which allows retrieving an exact set of specification data objects or the application plugin information describing an assessment setup for a certain purpose. The milestone mark may specify a certain step attained in a development project, so it would contain the project identificator and the step, or phase, or level, attained. A label on the same data file may carry the same project id.

In an example, the plurality of the meta configuration information sets may be stored in the database as individual data files, data records and/or posts. Specifically, the plurality of the specification data objects and/or the plurality of the application plugin information may be stored in the database in a specific structure. The database may store each individual file of the specification data objects and/or the plurality of the application plugin information. The database may also store the plurality of specification data and/or the plurality of the application plugin information in the form of data records referring to groups of data saved in a table. The database may further store the specification data objects and/or the plurality of the application plugin information in the form of posts addressing a certain data source path.

In an example, the method further includes providing the plurality of specification data objects in form of a specification hierarchy including several information layers for modulating the plurality of specification data objects based on a specification to be applied in a physical test environment. The specification hierarchy may be a specification organization structure, which may allow an establishment of a modulated set of specification data objects. The specification hierarchy may reference and/or load the plurality of specification data objects.

The specification hierarchy may include several information layers to facilitate a transfer of specification data objects to the assessment application tool. Among the several information layers, only a top information layer of the specification hierarchy may communicate with the application plugin information and/or the assessment application tool for providing the specification data objects. However, the top information layer may only indicate the specification data objects required for setting and/or performing the assessment environment but not store any specification data set. In other words, the top information layer may serve as an interface between the application plugin information and data sets of the specification data objects.

Conventional simulation tools generally utilize monolithic data set for configuring and executing a simulation, which is often stored as a single data file containing entire information. A different analysis may, thus, require another set of data, which may differ only in few modified parts. The unmodified parts of the new data set carry duplicate information without reference to each other between the contexts used. Apart from occupying more space, the duplicate information may not be separately extracted from the monolith data set, therefore it is hard to keep up to date. After some time, this can lead to a large number of variations of the monolith data set.

The specification hierarchy may include, for instance, at least three information layers. The first information layer may be configured to reference one or more specification data objects to be applied in the intended system assessment, wherein the specification data objects may be classified based on a specification to be applied in a physical test environment. The first information layer may serve as an interface for transferring the specification data objects to the assessment application tool via the application plugin information.

To the first information layer, a second information layer may be linked for loading the specification data objects referenced in the first information layer. Further, to the second information layer, a third information layer may be linked for loading at least one, preferably several data sets of the specification data objects loaded in the second information layer. Accordingly, an efficient data management in the database may be achieved.

In an example, the method further includes receiving an input for executing the system assessment only from a meta specification information set. The assessment application tool for performing the system assessment may have only the access to the meta specification information set. Specifically, the assessment application tool may be only connected to the first, i.e. top information layer of the specification hierarchy referencing one or more specification data objects necessary to build the assessment environment via the application plugin information, which may modify the format of the referenced specification data object according to the assessment application tool to be utilized.

In other words, the meta specification information set may be the sole input to the application tool and act as a "single source of truth". Accordingly, the application tool may not need to access entire monolithic data set for configuring and executing the simulation, which may improve process efficiency and reliability.

In an example, the method further includes sharing the plurality of meta specification information sets with several users. By means of the labels and/or tags provided to the plurality of meta specification information sets stored in the database, several users, for instance within a collaboration project, may be able to share a computer aided engineering (CAE) process with each other. In particular, the several users may be able to establish a similar or the same assessment set up sharing tool installation version, model data including repositories, description of how to run the simulation and/or pre- and post-processing etc.

The CAE process may be owned by the organization or entity that creates the data, which will then have full control of the resulting data collection. Any proprietary process can be easily standardized. The standardized process may contain all relevant data for the analysis, grouping the information in logical chunks, enabling piecewise versioning. The process and the data may be open for inspection by the CAE users and the stakeholders, providing full transparency of the assessment.

A segmentation and/or modulation of the specification data objects may increase understanding of the system assessment, providing the possibility of taking part responsibility, i.e. per domain. For instance, different users can take care of the test rig specification versus the post-process and key performance indicator (KPI) evaluations, which will be reflected in the database history (applying version control system). This means that the ownership of the analysis can be shared in a traceable and transparent manner. A particular specification can be reused in many different analysis, defined in different workorders.

In an example, the method further includes version controlling each meta specification information set. The term "version controlling" may be understood in that changes of data stored in the database may be controlled and tracked. Each newly generated version may be saved in an archive with a number or letter code. For instance, if a first change is made in an individual data set, the changed data set may be identified by "ver. 2".

Accordingly, any change of an initial or present data set of a meta configuration information set may initiate to create a new version of said data set, which may cause, in turn, a version control of the specification data object. By updating and creating new version(s) of each of the specification hierarchy, an evolution of information, normally reflected by its filename, may be easily tracked by the history itself and the hierarchy of specifications. Hence, traceability of the changes in the data sets and/or the specification data objects may be improved.

Updates of the meta configuration information sets may be made by a recombination of specification data objects, regarding purpose or just as updated version of one or several specification data objects for the same purpose. This may be useful when updating any data object that affects multiple assessment contexts, by producing a record of workorders and/or meta configuration information sets, that are affected and may have to be updated. Consequently, the analyses may be re-executed.

In an example, the method further includes creating an input interface based on at least one of the meta configuration information set found by filtering and new meta specification information set. The input interface may be part of the application plugin information and may include instructions for a data format of input data sets provided to the assessment application tool.

Accordingly, the input data sets including the plurality of meta configuration information set, particularly the plurality of specification data objects from several users may include a common data format, which may facilitate a data analysis such as parametric studies of the system across diverse system assessment tools. The results from the parametric studies may be subjected as intended initial and boundary conditions for the upcoming system assessment.

In an example, the method further includes creating an input interface for the system assessment based on each meta specification information set for parametric changes of input data including parametric values. The input interface may be configured to allow adjusting or modifying the input data including parametric values.

In an example, the method further includes storing the input data in the database, and labelling the input data using at least one label in regard to at least one context attribute.

In an example, the method further includes the collecting at least one output of the system assessment and analyzing the system assessment based on the output. The method may further include reading at least one output of the system assessment. The process scheduler information may also include codes for automatically collecting output generated by the system assessment.

At least one specification data object of the meta configuration information set may also include a script for post-processing, i.e. analyzing and/or reporting the output of the system assessment. The application plugin information, i.e. process scheduler may interpret such specification data object and run corresponding steps for analyzing and/or reporting.

By defining the analysis uniquely from a standardized meta configuration information sets or specification data objects, the analysis can be recreated in a traceable and quality ensured way. Particularly, by retrieving different test setups from the database, it may be easy to perform a comparison between the sets of data to understand differences in assessments.

In the reporting, the result may be represented as a table, a graphic and/or text. The result may compare and/or plot the output with the respective input, e.g. meta configuration information set.

In an example, the output includes a predefined output format, which being an application tool-independent format. The method may further include modifying the at least one output to include a predefined output format via the application plugin information, wherein the output may include a specific data format of the respective assessment application tool.

Accordingly, the format of the output may be modified through the application plugin information and the output may include a predefined format. Thus, even though several system assessments are performed by diverse assessment application tools from different engineering perspectives, their output may include a uniform format, which may lead to an efficient combination of the computational results from the different engineering domains.

The output may be, for instance, a key performance indicator (KPI) referring to key figures that can be used to measure and/or determine a progress or a degree of fulfillment with regard to important objectives or critical success factors within a system.

In an example, the method further includes storing the output in the database, and labelling the output using at least one label in regard to at least one context attribute. The output of the system assessment may be stored in the database. Each output may be associated or linked to one or more context attributes. Accordingly, each output may be labelled with at least one label defining or describing the respective context attribute.

Particularly, the results of the system assessment may be stored in such a way that the input data objects, i.e. meta configuration information set may be coupled with the respective results or output, which makes the output fully traceable. Accordingly, a data management of big data may be facilitated.

According to the present disclosure, a computer program element for performing a system assessment is presented. The computer program element is adapted to perform the method steps as described above, when being executed by a processing element.

According to the present disclosure, one or more computer storage media is presented. The computer storage media is encoded with instructions, that when executed by a computer, cause the computer to perform the operations of the respective method as described above.

The storage media may include internal to a computing device, such as a computer's SSD, or a removable device such as an external HDD or universal serial bus (USB) flash drive. There are also other types of storage media, including magnetic tape, compact discs (CDs) and non-volatile memory (NVM) cards.

According to the present disclosure, a computer system is presented. The system includes one or more computer storage media as described above and a computer for executing the instructions.

It should be noted that the above examples may be combined with each other irrespective of the aspect involved. Accordingly, the method may be combined with structural features and, likewise, the system may be combined with features described above with regard to the method.

These and other examples of the present disclosure will become apparent from and elucidated with reference to the embodiments described hereinafter.

BRIEF DESCRIPTION OF THE DRAWINGS

Examples according to the present disclosure will be described in the following with reference to the following drawings.

DESCRIPTION OF EMBODIMENTS

Figure 1:
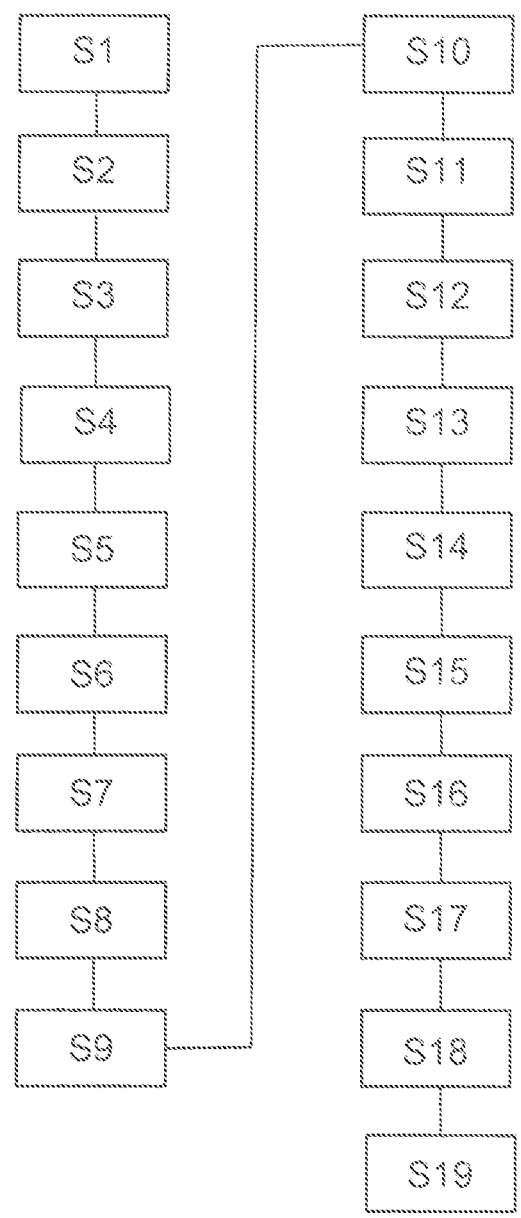
FIG. 1 shows schematically and exemplarily an example of a flowchart of a computer-implemented method for performing a system assessment according to the present disclosure.
Figure 2:
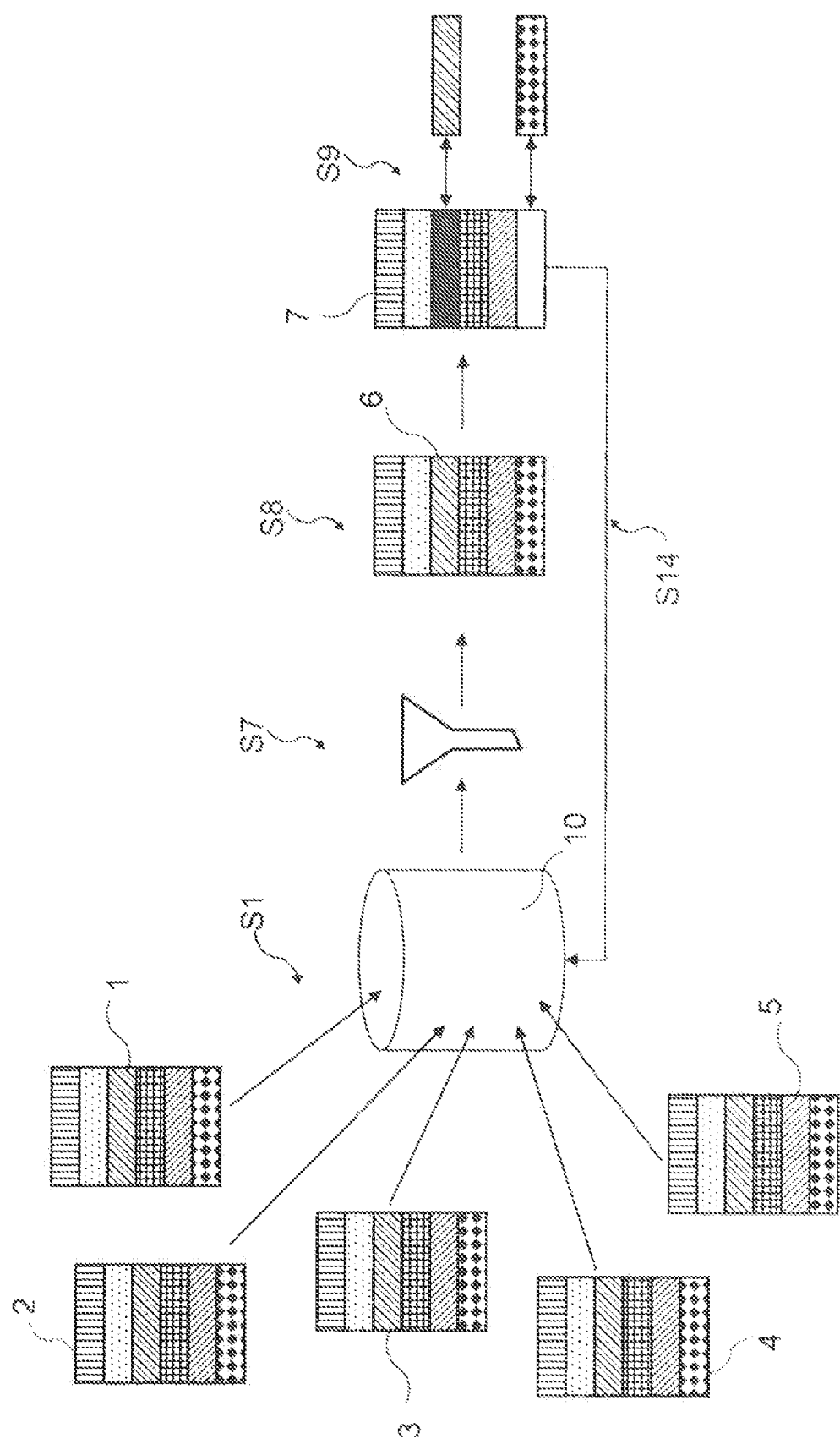
FIG. 2 shows schematically and exemplarily an example of a computer-implemented method for performing a system assessment according to the present disclosure.

FIG. 1 and FIG. 2 show a computer-implemented method for performing a system assessment according to the present disclosure. The method may be adapted to understand or predict a technical object or a technical system based on information defining the system to be analyzed and its environment, for instance predicting and/or analyzing a crash event of a vehicle, a driving performance of the vehicle, etc. The method may be performed not necessarily in this order.

Each element in FIG. 1 in combination with FIG. 2 indicates:
S1 collecting a plurality of meta configuration information sets 1, 2, 3, 4, 5 of prior system assessments in a database 10,
  wherein the meta configuration information sets 1, 2, 3, 4, 5 includes a plurality of specification data objects and application plugin information,
  wherein the application plugin information includes a process scheduler information on at least one application protocol interface and/or at least one analysis methodology;
S2 providing the plurality of specification data objects in the form of a specification hierarchy including several information layers for modulating the plurality of specification data objects based on a specification to be applied in a physical test environment;
S3 version controlling each meta specification information set;
S4 associating the plurality of specification data objects and the application plugin information with at least one context attribute based on their purpose in the system assessment;
S5 labelling at least one of the specification data objects and the application plugin information using at least one label in regard to at least one context attribute,
  wherein the label includes at least one attribute of assessment setup, architecture, project, product ID, product attributes, application tools and post-process, or the like;
S6 tagging a specific meta configuration information set including specification data objects and the application plugin information, wherein the specific meta configuration information set is unchangeable;
S7 filtering the plurality of meta configuration information sets 1, 2, 3, 4, 5 by a database query based on at least one label and finding a meta configuration information 6 set required for the system assessment based on at least one label;

S8 reviewing the meta configuration information set 6 found by filtering S7 and modifying at least one of the specification data object or the application plugin information of the meta configuration information set 6;

S9 creating a new meta configuration information set 7;

S10 creating an input interface based at least one of the meta configuration information set 6 found by filtering S7 and new meta specification information set 7;

S11 receiving an input data for executing the system assessment only from the new meta specification information set 7,
wherein the input interface is configured for parametric changes of input data including parametric values;

S12 modifying parametric values in input data;

S13 executing the system assessment based on the new meta configuration information set 7;

S14 storing the new meta specification information set 7 or input data including parametric values in the database 10, and labelling the input data using at least one label in regard to at least one context attribute;

S15 collecting at least one output of the system assessment and analyzing the system assessment based on the output,
wherein the output includes a predefined output format, which is an application tool-independent format;

S16 storing the output in the database 10, and labelling the output using at least one label in regard to at least one context attribute;

S17 updating the parametric values and repeating the steps S10-S16;

S18 analyzing and reporting of the system assessment based on the output; and

S19 sharing the new meta specification information set 7 with several users.

Accordingly, a reliable and strong data backbone may be provided by combining standardized application protocol via the application plugin information, a modular information structure of the specification data objects and metadata referenced based on their purpose in the system assessment. Further, a standardized process for the system assessment can be realised and a method to collaboratively interchange of collected data among several users can be facilitated.

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed examples. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A non-transitory computer readable medium comprising instructions stored in one or more memories and executed by one or more processors to carry out the steps comprising:
   storing a plurality of meta configuration information sets of prior system assessments in a database, the meta configuration information sets comprising a plurality of specification data objects and application plugin information, at least one of the specification data objects and the application plugin information in the database labeled with at least one label indicating at least one context attribute associating the at least one of the specification data objections and the application plugin information with its purpose in the prior system assessments;
   filtering the plurality of meta configuration information sets in the database to find a meta configuration information set required for a subsequent vehicle system assessment or simulation based on the at least one label;
   displaying the meta configuration information set found by filtering to a user;
   modifying at least one of specification data objects and application plugin information associated with the meta configuration information set found by filtering and displayed to the user to conform to the subsequent vehicle system assessment or simulation such that a new meta configuration information set is generated;
   communicating the new meta configuration information set to the subsequent vehicle system assessment or simulation as a specification hierarchy including multiple information layers;
   providing the subsequent vehicle system assessment or simulation with global information generated from the new meta configuration information set utilizing a global template such that the subsequent vehicle system assessment or simulation may be executed independently of at least one of an object or a system to be simulated, an assessment tool to be utilized, a test environment, or test parameters; and
   executing the subsequent vehicle system assessment or simulation using the global information generated from the new meta configuration information set and the specification hierarchy, wherein a first layer of the specification hierarchy is configured to communicate with at least one of the application plugin information or an assessment application tool to provide at least one of the specification data objects of the new meta configuration information set and necessary to build an assessment environment to the assessment application tool via the application plugin information.

2. The non-transitory computer readable medium according to claim 1, the steps further comprising, reviewing the meta configuration information set found by filtering and modifying at least one of the specification data objects or the application plugin information of the meta configuration information set to create the new meta configuration information set.

3. The non-transitory computer readable medium according to claim 2, the steps further comprising, storing the new meta configuration information set in the database, and labelling the specification data objects and the application plugin information of the new meta configuration information set using at least one label in regard to at least one context attribute.

4. The non-transitory computer readable medium according to claim 1, the application plugin information comprising a process scheduler information comprising at least one application protocol interface and/or at least one analysis methodology.

5. The non-transitory computer readable medium according to claim 1, filtering the meta configuration information set being performed by a database query based on at least one label.

6. The non-transitory computer readable medium according to claim 1, the steps further comprising, tagging a specific meta configuration information set comprising specification data objects and the application plugin information with at least one tag, the specific meta configuration information set being unchangeable.

7. The non-transitory computer readable medium according to claim 1, the label comprising at least one attribute of assessment setup, architecture, project, product ID, product attributes, application tools and post-process.

8. The non-transitory computer readable medium according to claim 1, the steps further comprising, providing the plurality of specification data objects in form of a specification hierarchy comprising several information layers for modulating the plurality of specification data objects based on a specification to be applied in a physical test environment.

9. The non-transitory computer readable medium according to claim 1, the steps further comprising, receiving an input for executing the system assessment only from at least one of the meta configuration information set found by filtering and the new meta configuration information set.

10. The non-transitory computer readable medium according to claim 1, the steps further comprising, sharing at least one meta specification information set with several users.

11. The non-transitory computer readable medium according to claim 1, the steps further comprising, version controlling each meta specification information set.

12. The non-transitory computer readable medium according to claim 1, the steps further comprising, creating an input interface based on at least one of the meta configuration information set found by filtering and the new meta configuration information set.

13. The non-transitory computer readable medium according to claim 12, creating an input interface comprising creating an input interface for parametric changes of input data comprising parametric values.

14. The non-transitory computer readable medium according to claim 1, the steps further comprising, collecting at least one output of the subsequent vehicle system assessment or simulation and analyzing the subsequent vehicle system assessment or simulation based on the output.

15. The non-transitory computer readable medium according to claim 14, the output comprising a predefined output format, which being an application tool-independent format.

16. The non-transitory computer readable medium according to claim 14, the steps further comprising, storing the output in the database, and labelling the output using at least one label in regard to at least one context attribute.

17. The non-transitory computer readable medium according to claim 1, the steps further comprising, labelling the new meta configuration information set using the at least one label defining or describing the at least one context attribute and storing a labelled new meta configuration information set in the database.

* * * * *